United States Patent
Muller

(10) Patent No.: US 10,760,496 B2
(45) Date of Patent: Sep. 1, 2020

(54) ISOLATION OF AN AIRCRAFT TURBO ENGINE TANK IN CASE OF A FIRE BY CLOSING A VALVE SENSITIVE TO THE RELEASE OF AN EXTINGUISHING AGENT

(71) Applicant: SAFRAN AIRCRAFT ENGINES, Paris (FR)

(72) Inventor: Jean-Louis Muller, Maisons-Alfort (FR)

(73) Assignee: SAFRAN AIRCRAFT ENGINES, Paris (FR)

( * ) Notice: Subject to any disclaimer, the term of this patent is extended or adjusted under 35 U.S.C. 154(b) by 297 days.

(21) Appl. No.: 15/746,501

(22) PCT Filed: Jul. 26, 2016

(86) PCT No.: PCT/FR2016/051939
§ 371 (c)(1),
(2) Date: Jan. 22, 2018

(87) PCT Pub. No.: WO2017/021621
PCT Pub. Date: Feb. 9, 2017

(65) Prior Publication Data
US 2018/0209346 A1 Jul. 26, 2018

(30) Foreign Application Priority Data
Jul. 31, 2015 (FR) ...................... 15 57425

(51) Int. Cl.
*F02C 7/06* (2006.01)
*F02C 7/25* (2006.01)
(Continued)

(52) U.S. Cl.
CPC ................ *F02C 7/25* (2013.01); *B64D 37/32* (2013.01); *F02C 7/06* (2013.01); *F02C 7/22* (2013.01);
(Continued)

(58) Field of Classification Search
CPC ...... F02C 7/06; F02C 7/22; F02C 7/25; F02C 7/14; F05D 2260/52; F05D 2260/57;
(Continued)

(56) References Cited

U.S. PATENT DOCUMENTS 2,952,125 A * 9/1960 Brunton .................... F02C 7/25
60/39.091
4,304,093 A 12/1981 Schulze
(Continued)

FOREIGN PATENT DOCUMENTS

EP 1 936 122 A1 6/2008
GB 870 705 A 6/1961

OTHER PUBLICATIONS

International Search Report dated Nov. 11, 2016 in PCT/FR2016/051939 filed Jul. 26, 2016.
(Continued)

*Primary Examiner* — William H Rodriguez
(74) *Attorney, Agent, or Firm* — Oblon, McClelland, Maier & Neustadt, L.L.P.

(57) ABSTRACT

A method for isolating a tank of oil from a downstream portion of an oil supply system for a turbine engine is provided. The oil supply system includes the oil tank and a cutoff valve located between the oil tank and the downstream portion. The cutoff valve is configured to limit a flow of oil towards the downstream portion. The cutoff valve is fluidically linked to a fire extinguishing system by a fluid communication device. The method includes closing the cutoff valve in response to an increase in extinguishant pressure in the fluid communication device.

13 Claims, 2 Drawing Sheets

(51) Int. Cl.
  *B64D 37/32*    (2006.01)
  *F02C 7/22*     (2006.01)
  *F01D 25/18*    (2006.01)
  *F02C 7/14*     (2006.01)
(52) U.S. Cl.
  CPC ............... *F01D 25/18* (2013.01); *F02C 7/14* (2013.01); *F05D 2260/98* (2013.01); *Y02T 50/671* (2013.01)
(58) Field of Classification Search
  CPC ........... F05D 2260/98; F05D 2220/323; B64D 37/32; Y02T 50/671; F01D 25/18; F01D 25/20
  See application file for complete search history.

(56) References Cited

U.S. PATENT DOCUMENTS

| | | | |
|---|---|---|---|
| 4,915,127 A * | 4/1990 | Werley | G05D 16/0663 137/505.42 |
| 10,336,464 B2 * | 7/2019 | Charlemagne | A62C 3/08 |
| 2016/0195196 A1 * | 7/2016 | Ringer | F16K 11/161 169/19 |
| 2017/0022906 A1 * | 1/2017 | Lepage | F02C 9/46 |
| 2018/0156139 A1 * | 6/2018 | Waissi | F01D 25/20 |

OTHER PUBLICATIONS

French Search Report dated Jun. 15, 2016 in French Application 1557425 filed Jul. 31, 2015.

\* cited by examiner

ISOLATION OF AN AIRCRAFT TURBO ENGINE TANK IN CASE OF A FIRE BY CLOSING A VALVE SENSITIVE TO THE RELEASE OF AN EXTINGUISHING AGENT

TECHNICAL DOMAIN

The invention relates to isolation of a tank for an aircraft turbomachine combustible fluid supply system in case of fire.

BACKGROUND OF THE INVENTION

Some regulations require that an aircraft turbomachine should be capable of resisting fire for a minimum duration, while preventing the supply of combustible fluid, typically lubricant, to the fire.

Various turbomachine equipment is supplied with lubricant by, a lubrication system that generally allows a sufficient lubricant flow to pass to cool the turbomachine in case of fire.

However, when the lubricant flow drops to become too low during a fire, the oil flow to this equipment has to be limited and/or a specific fire protection has to be provided for this equipment. These specific fire protection systems have the disadvantage of being large and heavy.

It is also known that the flow of lubricant in the case of a fire can be limited by isolating the lubricant tank by a cutoff valve controlled by a regulation system, at least until the fire is definitively extinguished.

Nevertheless, the regulation system of some turbomachines or some aircraft may not be available during the fire to control closure of this cutoff valve, for example as confirmed in application EP 1 936 122, which can generate unwanted cutoffs even when there is no fire.

Therefore there is a need to isolate a turbomachine combustible fluid tank only in the case of a fire, while limiting availability requirements of a regulation system, and the mass and dimensions of the turbomachine.

PRESENTATION OF THE INVENTION

The invention is aimed at at least partially solving problems encountered in solutions according to prior art.

In this respect, the purpose of the invention is an assembly for a turbomachine comprising a fire extinguishing system and a combustible fluid supply system. The fire extinguishing system is configured to release an extinguishing agent into the turbomachine. The fluid supply system comprises a tank, a downstream part located downstream from the tank, and a cutoff valve located between the tank and the downstream part. The cutoff valve is configured to limit/prevent a fluid flow towards the downstream part in case of fire.

According to the invention, the assembly comprises fluid communication means forming a fluid connection between the fire extinguishing system and the cutoff valve, the cutoff valve being configured to close in response to, an increase in the pressure of an extinguishing agent in the fluid communication means.

The supply system is then lighter weight and more compact that if it were fitted with specific fire protection means.

Moreover, the turbomachine and/or aircraft regulation system is not used to close the cutoff valve in case of fire because it closes automatically under the effect of an increase in pressure of the extinguishing agent in the fluid communication means when an extinguishing agent is released into the fire extinguishing system.

The combustible fluid is preferably the lubricant. As a variant, it can be fuel.

Optionally, the invention may include one or several of the following characteristics, possibly but not necessary combined with each other.

Advantageously, the fire extinguishing system comprises at least one pipe to carry the extinguishing agent under pressure into the turbomachine, and the fluid communication means comprise a conduit between the pipe and the cutoff valve. The cutoff valve is then configured to close in response to an increase in the pressure of the extinguishing agent in the conduit.

According to one special embodiment, the fire extinguishing system comprises at least one stock of extinguishing agent. The extinguishing agent is preferably stored under pressure in the stock.

In one advantageous embodiment, the cutoff valve comprises one inlet for the fluid and one outlet for the fluid. The cutoff valve also comprises an extinguishing agent inlet orifice with a fluid connection to the fire extinguishing system. The cutoff valve is configured to limit/prevent the circulation of fluid between the inlet and the outlet, in response to an increase in the pressure of the extinguishing agent in the extinguishing agent inlet orifice.

Preferably, the cutoff valve includes a closing trigger and a spring device. The valve is configured such that a force applied by the pressure of the extinguishing agent applied to the trigger is amplified by the spring device to close the cutoff valve.

According to another advantageous embodiment, the cutoff valve is configured to be reset manually, the obturator of the cutoff valve moving from its extreme closed position to its extreme open position.

The invention also relates to a method of isolating a tank of combustible fuel from a downstream part of the turbomachine fluid supply system, the supply system including the tank and a cutoff valve located between the tank and the downstream part, the cutoff valve being configured to limit/prevent a fluid flow towards the downstream part, the cutoff valve being connected with a fire extinguishing system by fluid communication means, the extinguishing system being configured to release an extinguishing agent into the turbornachine. According to the invention, the method comprises a step to close the cutoff valve in response to an increase in the pressure of the extinguishing agent in the fluid communication means.

Preferably, the cutoff valve comprises an obturator that is free to move between an extreme open position and an extreme closed position. The cutoff valve allows fluid to flow towards the downstream part when the obturator is in the extreme open position. The cutoff valve prevents the supply of fluid to the downstream part when the obturator is in the extreme closed position. The obturator will be in the extreme open position as long as the extinguishing agent has not been released into the fluid communication means.

According to another particular embodiment, the method of isolating the tank includes a step to prevent the turbomachine reaching takeoff speed when the cutoff valve is at least partially closed.

According to another particular embodiment, the method of isolation includes a step to limit/prevent the valve from opening later until the end of the flight of the turbomachine, once the cutoff valve has closed due to an increase in the pressure of the extinguishing agent in the fluid communication means. This limits the risk of supplying combustible fluid to a fire until the end of the flight.

The invention also relates to a method of extinguishing a fire in a turbomachine comprising:

a step to release an extinguishing agent into the turbomachine after a fire has been detected in the turbomachine, to extinguish the fire, and implementation of the isolation method as defined above, in response to an increase in the pressure of the extinguishing agent in the fluid communication means.

BRIEF DESCRIPTION OF THE DRAWINGS

This invention will be better understood after reading the description of example embodiments, given purely for information and in no way limitative, with reference to the appended drawings on which.

DETAILED PRESENTATION OF PARTICULAR EMBODIMENTS

Identical, similar or equivalent parts of the different figures have the same numeric references to facilitate the comparison between different figures.

Figure 1:
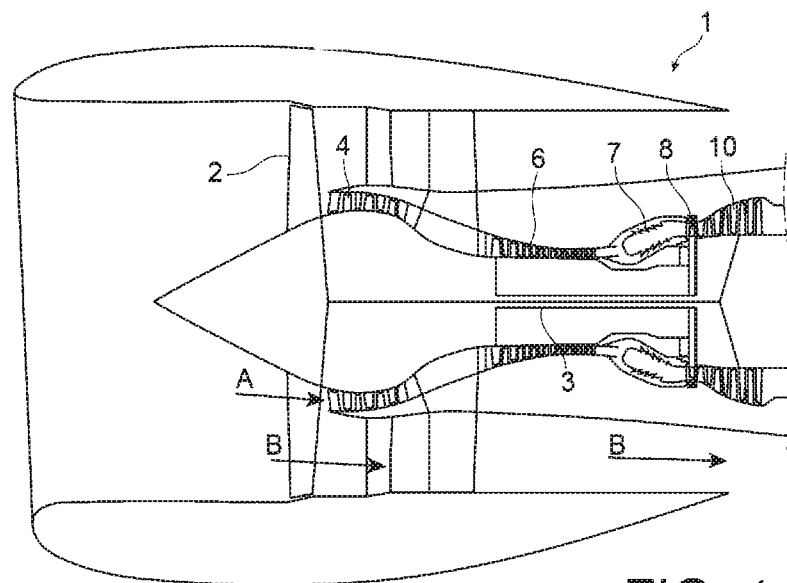
FIG. 1 is a partial diagrammatic longitudinal sectional view of an aircraft turbomachine.

FIG. 1 represents an annular twin-spool turbofan 1 centred on an axis 3 of the turbomachine. The turbornachine 1 comprises a fan 2, a low-pressure compressor 4, a high-pressure compressor 6, a combustion chamber 7, a high-pressure turbine 8 and a low-pressure turbine 10, in this order along the flow path of a core flow A.

The low-pressure compressor 4, the high-pressure compressor 6, the high-pressure turbine 8 and the low-pressure turbine 10 delimit a secondary bypass fan flow stream B that bypasses these components.

The high-pressure compressor 6 and the high-pressure turbine 8 are mechanically connected by a drive shaft of the high-pressure compressor 6, to form a high-pressure body of the turbomachine 1. Similarly, the low-pressure compressor 4 and the low-pressure turbine 10 are mechanically connected by a shaft of the turbomachine 1, so as to form a low-pressure case.

Figure 2:
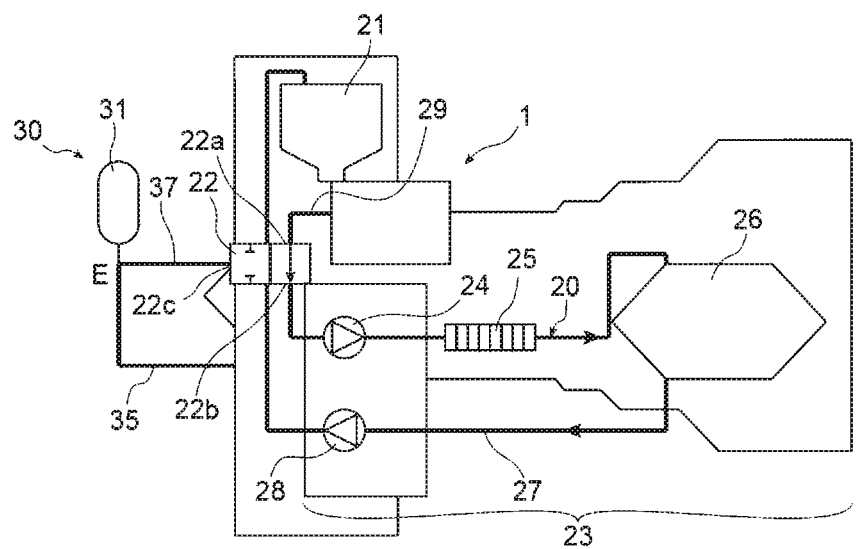
FIG. 2 functionally represents a lubricant supply system and a fire extinguishing system according to a first embodiment of the invention.

With reference to FIG. 2, the turbomachine comprises a lubricant supply system that comprises a lubricant supply system 20 and a lubricant return line 27. This lubricant is typically oil.

The lubricant supply system 20 is designed to supply lubricant to various turbomachine equipment located inside lubrication chambers 26. The supply system 20 comprises a lubricant tank 21, a downstream part 23 that is located downstream from the tank 21 and a cutoff valve 22 located between the tank 21 and the downstream part 23.

The "upstream" and "downstream" directions are defined relative to the general lubricant flow direction from the tank 21 to the lubrication chambers 26.

The downstream part 23 comprises a lubricant supply pump 24 and a heat exchanger 25. In this case, the exchanger 25 is located between the supply pump 24 and the lubrication chambers 26. It will be understood that the exchanger 25 can be located in another position in the downstream part 23.

The lubricant cools in the exchanger 25 before returning into the tank 21, which limits risks of premature degradation of the lubricant.

The cutoff valve 22 comprises a single lubricant inlet 22a and a single lubricant outlet 22b. There is a fluid connection between the inlet 22a and the tank 21, and between the outlet 22b and the downstream part 23.

The cutoff valve 22 comprises a bistable obturator that is free to move between a stable extreme open position and a stable extreme closed position. The cutoff valve will be reset manually so that the obturator can move from its extreme closed position to its extreme open position.

According to one embodiment, the obturator of the cutoff valve 22 is made so that it progressively closes off the lubricant flow, such that the cutoff valve 22 limits the lubricant flow towards the downstream part 23.

In the extreme open position, the cutoff valve 22 allows lubricant to flow between its inlet 22a and its outlet 22b. The lubricant then flows freely in a pipe 29 that connects the tank 21 to the supply pump 24. This pipe 29 is a large diameter pipe, typically between 0.75 and 2 inches (between 19.05 and 50.80 millimetres) and it is easily accessible, as is also the cutoff valve 22, so that the cutoff valve 22 can be reset manually.

In the extreme closed position, the cutoff valve 22 prevents lubricant from flowing from its inlet 22a to its outlet 22b, to prevent circulation of lubricant in the pipe 29 towards the downstream part 23.

The obturator is in the extreme closed position if a fire is detected in the turbomachine. It is particularly useful for the cutoff valve 22 to be closed in case of fire in the turbomachine 1 when the lubricant flow in the supply system 20 would be too low to sufficiently cool the supply system 20. Therefore the extreme closed position of the obturator is its safety position towards which it tends to return naturally when it is not in the extreme open position.

During normal operation of the turbomachine, the obturator is in the extreme open position to satisfactorily lubricate equipment located in the lubrication chambers 26.

After supplying the various equipment in lubrication chambers 26, the lubricant returns to the tank 21 through the lubricant return line 27. The return line 27 comprises a lubricant return pump 28 that moves the lubricant so that it can flow towards the tank 21.

The turbomachine 1 is also fitted with a fire extinguishing system 30 configured to release an extinguishing agent into the turbomachine 1, when a fire is detected in it.

The fire extinguishing system 30 comprises at least one cylinder 31 of extinguishing agent. This cylinder 31 forms a stock of extinguishing agent. The extinguishing agent in it is stored under pressure, ready to be released into a pipe 35 that carries it into the turbomachine 1. The pipe 35 then carries the extinguishing agent under pressure to the fire.

A conduit 37 forms a fluid connection between the pipe 35 and an extinguishing agent inlet orifice 22c formed in the cutoff valve 22. This conduit 37 thus acts as fluid communication means connecting the fire extinguishing system 30 to the cutoff valve 22.

The inside of the conduit 37 is empty during normal operation of the turbomachine 1. It is filled with extinguishing agent under pressure when the cylinder 31 releases the extinguishing agent, which increases the pressure of extinguishing agent in this conduit 37. The conduit 37 is only useful for detecting a pressure increase in the extinguishing agent outside the cylinder 31 and it is not used to carry extinguishing agent through the cutoff valve 22 to the fire.

Consequently, the diameter of the conduit 37 is small compared with the diameter of the pipe 35. The diameter of the conduit 37 unlike the diameter of the pipe 35 may for example by between 0.25 and 0.75 inches (between 6.35 and 19.05 millimetres).

Furthermore, the dimensions and the location of the conduit 37 are chosen such that the pressure in the extinguishing agent at the extinguishing agent orifice 22c is approximately equal to the pressure at the connection node E between the conduit 37 and the pipe 35.

The extinguishing agent inlet orifice 22c is the only extinguishing agent inlet into the cutoff valve 22. There is no fluid connection between the inlet orifice 22c of the extinguishing agent and the inlet 22a and the outlet 22b, so that the extinguishing agent does not mix with the lubricant.

Furthermore, there is no outlet for the extinguishing agent in the cutoff valve 22. The pressure in the extinguishing agent that arrives at the extinguishing agent orifice 22c then creates a force applied to the spring device that amplifies the intensity of this force to close the cutoff valve 22. The obturator will be in the extreme open position as long as the extinguishing agent has not been released in the fluid communication means 37. Once the pressure in the extinguishing agent is high enough, the obturator moves from its extreme open position to its extreme closed position.

The cutoff valve 22 then closes in response to an increase in the pressure of the extinguishing agent in the conduit 37 and in the extinguishing agent inlet orifice 22c. In other words, the cutoff valve 22 prevents the circulation of lubricant between the inlet 22a and the outlet 22b, in response to a release of extinguishing agent into the conduit 37.

Figure 3:
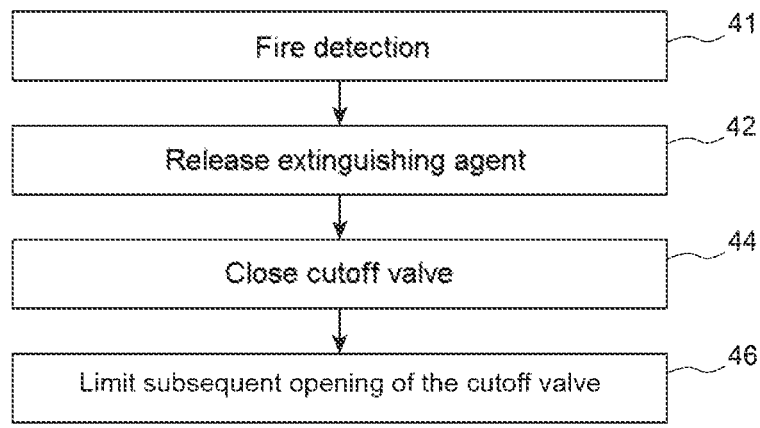
FIG. 3 illustrates the implementation of a method of isolating the tank from the supply system according to the first embodiment.

With reference to FIG. 3, when a fire is detected in the turbomachine in step 41, extinguishing agent is released outside the cylinder 31 into the pipe 35 that carries it firstly to the fire and secondly to the conduit 37, in step 42.

The arrival of extinguishing agent into the conduit 37 generates an increase in pressure in the conduit 37 that is also felt at the extinguishing agent inlet orifice 22c in valve 22. This pressure increase in the extinguishing agent in the valve 22 triggers movement of the obturator from its extreme open position to its extreme closed position, in step 44.

The obturator then remains in its extreme closed position until the end of the flight of the turbomachine 1, in step 46, to limit risks that lubricant will stagnate in the lubricant supply system 20 before the fire is completely extinguished.

Figure 4:
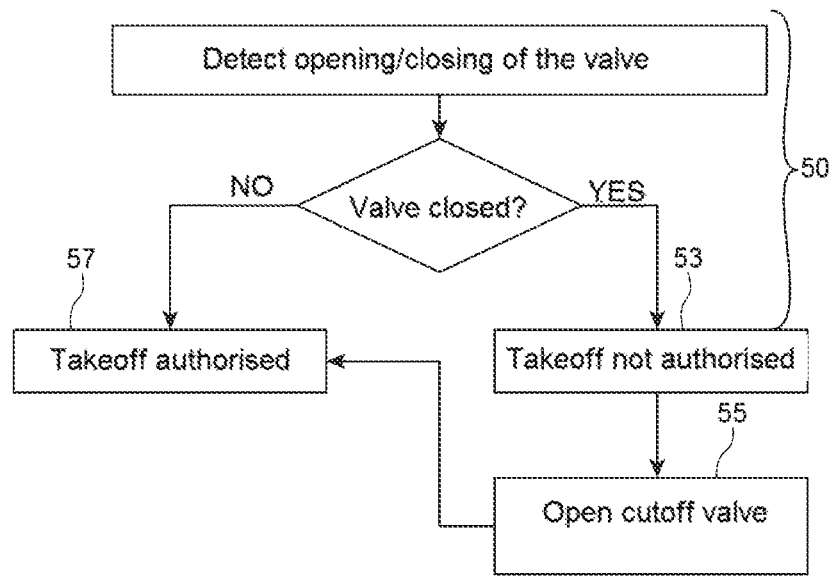
FIG. 4 illustrates the implementation of a method for checking that the valve is closed before takeoff of the turbomachine.

With reference to FIG. 4, in step 50, it is detected if the obturator is in the extreme open position so as to authorise or prevent takeoff of the turbomachine 1.

When the obturator is detected to be in the extreme open position, takeoff of the turbomachine is authorised in step 57.

But on the contrary, if it is detected that the obturator is in a partially closed position, and particularly in the extreme closed position, takeoff of the turbomachine is prohibited in step 53, until the cutoff valve 22 has been reset so that the obturator can move from its extreme closed position to its extreme open position, in step 55.

Once the cutoff valve 22 has been reset manually, takeoff of the turbomachine 1 is authorised in step 57.

Obviously, an expert in the subject could make various modifications to the invention that has just been described without going outside the framework of the presentation of the invention.

In particular, the fluid communication means can include a nozzle in addition to the conduit 37.

Furthermore, the combustible fluid can be fuel. In this case, there is no fuel return line to the tank. The lubrication chambers 26 are replaced by equipment that has to be supplied with fuel, such as variable geometries or turbomachine combustion chamber injectors.

Finally, the cutoff valve can be controlled by a regulation system, and preferably a digital regulation system that can consist of a mechanical type regulation system.

The invention claimed is:

1. An assembly for turbomachine comprising:
   a fire extinguishing system configured to release an extinguishing agent into the turbomachine; and
   an oil supply system for a turbomachine comprising:
   an oil tank,
   a downstream part located downstream from the oil tank, and
   a cutoff valve located between the oil tank and the downstream part, wherein the cutoff valve comprises an obturator and the cutoff valve is configured to limit/prevent oil flow towards the downstream part,
   wherein the assembly comprises fluid communication means forming a fluid connection between the fire extinguishing system and the cutoff valve, wherein the cutoff valve is configured to close in response to an increase in the pressure of an extinguishing agent in the fluid communication means.

2. The assembly according to claim 1, wherein the fire extinguishing system comprises at least one pipe to carry extinguishing agent under pressure into the turbomachine, and
   wherein the fluid communication means comprise a conduit located between the pipe and the cutoff valve, wherein the cutoff valve is configured to close in response to a pressure increase caused by an arrival of extinguishing agent into the conduit.

3. The assembly according to claim 1, wherein the fire extinguishing system comprises at least one stock of extinguishing agent.

4. The assembly according to claim 1, wherein the cutoff valve comprises an oil inlet for oil and an oil outlet for the oil, and
   wherein the cutoff valve comprises an extinguishing agent inlet orifice with a fluid connection to the fire extinguishing system,
   wherein the cutoff valve is configured to limit/prevent the circulation of oil between the oil inlet and the oil outlet, in response to an increase in the pressure of the extinguishing agent in the extinguishing agent inlet orifice.

5. The assembly according to claim 1, wherein the cutoff valve comprises a closing trigger and a spring device,
   wherein the cutoff valve is configured such that a force applied by the pressure of the extinguishing agent applied to the trigger is amplified by the spring device to close the cutoff valve.

6. The assembly according to claim 1, wherein the cutoff valve is configured to be reset manually, wherein the obturator of the cutoff valve moves from an extreme closed position thereof to an extreme open position thereof when the cutoff valve is reset manually.

7. A method of isolating an oil tank from a downstream part of an oil supply system for a turbomachine,
   the oil supply system including the oil tank and a cutoff valve located between the oil tank and the downstream part, wherein the cutoff valve is configured to limit/prevent oil flow towards the downstream part, wherein there is a fluid connection between the cutoff valve and a fire extinguishing system through fluid communication means, wherein the fire extinguishing system is configured to release an extinguishing agent into the turbomachine, the method comprising:

closing the cutoff valve in response to an increase in the pressure of the extinguishing agent in the fluid communication means.

8. The method according to claim 7, wherein the cutoff valve comprises an obturator free to move between an extreme open position and an extreme closed position, the cutoff valve allowing oil to flow towards the downstream part when the obturator is in the extreme open position, the cutoff valve preventing the supply of oil to the downstream part when the obturator is in the extreme closed position, and wherein the obturator of the cutoff valve is in the extreme open position as long as the extinguishing agent has not been released into the fluid communication means.

9. The method according to claim 7, further comprising preventing the turbomachine reaching takeoff speed when the cutoff valve is at least partially closed.

10. The method according to claim 7, further comprising limiting/preventing the cutoff valve from opening later until an end of flight of the turbomachine, once the cutoff valve has closed due to an increase in the pressure of the extinguishing agent in the fluid communication means.

11. The assembly according to claim 3, wherein the extinguishing agent is stored under pressure in the stock.

12. The assembly according to claim 1, wherein the downstream part of the oil supply system includes an oil supply pump, a heat exchanger, and a lubrication chamber in which equipment of the turbomachine is located, the heat exchanger being disposed upstream of the lubrication chamber.

13. The method according to claim 7, wherein the downstream part of the oil supply system includes an oil supply pump, a heat exchanger, and a lubrication chamber in which equipment of the turbomachine is located, the heat exchanger being disposed upstream of the lubrication chamber.

* * * * *